United States Patent [19]

Paielli

[11] 4,323,264
[45] Apr. 6, 1982

[54] TRAILER LOAD SUPPORTING ASSEMBLY

[76] Inventor: Michael F. Paielli, 4070 Longtin, Lincoln Park, Mich. 48146

[21] Appl. No.: 136,494

[22] Filed: Apr. 3, 1980

[51] Int. Cl.³ ............................................. B62D 53/04
[52] U.S. Cl. .................................. 280/405 A; 280/432
[58] Field of Search ........... 280/405 A, 405 R, 406 R, 280/432, 159, 711

[56] References Cited

U.S. PATENT DOCUMENTS

| | | | |
|---|---|---|---|
| 2,941,818 | 6/1960 | Hubbard | 280/405 A |
| 3,044,762 | 7/1962 | Stengelin | 280/711 |
| 3,136,566 | 6/1964 | Harding | 280/405 A |
| 3,227,470 | 1/1966 | Funk | 280/405 A |
| 3,363,914 | 1/1968 | Neel, Jr. | 280/405 A |
| 3,580,609 | 5/1971 | Paielli | 280/405 A |
| 3,776,573 | 12/1973 | Paielli | 280/405 A |
| 4,067,592 | 1/1978 | Horton | 280/432 |

*Primary Examiner*—David M. Mitchell
*Assistant Examiner*—Donn McGiehan
*Attorney, Agent, or Firm*—Harness, Dickey & Pierce

[57] ABSTRACT

A trailer load supporting assembly for over the road tractors and trailers comprises a housing with a pair of air bags inside, the housing having a base member for attachment to the tractor and a top member telescoped over the base member which is movable against the bottom of the trailer in accordance with inflation of the air bags.

3 Claims, 4 Drawing Figures

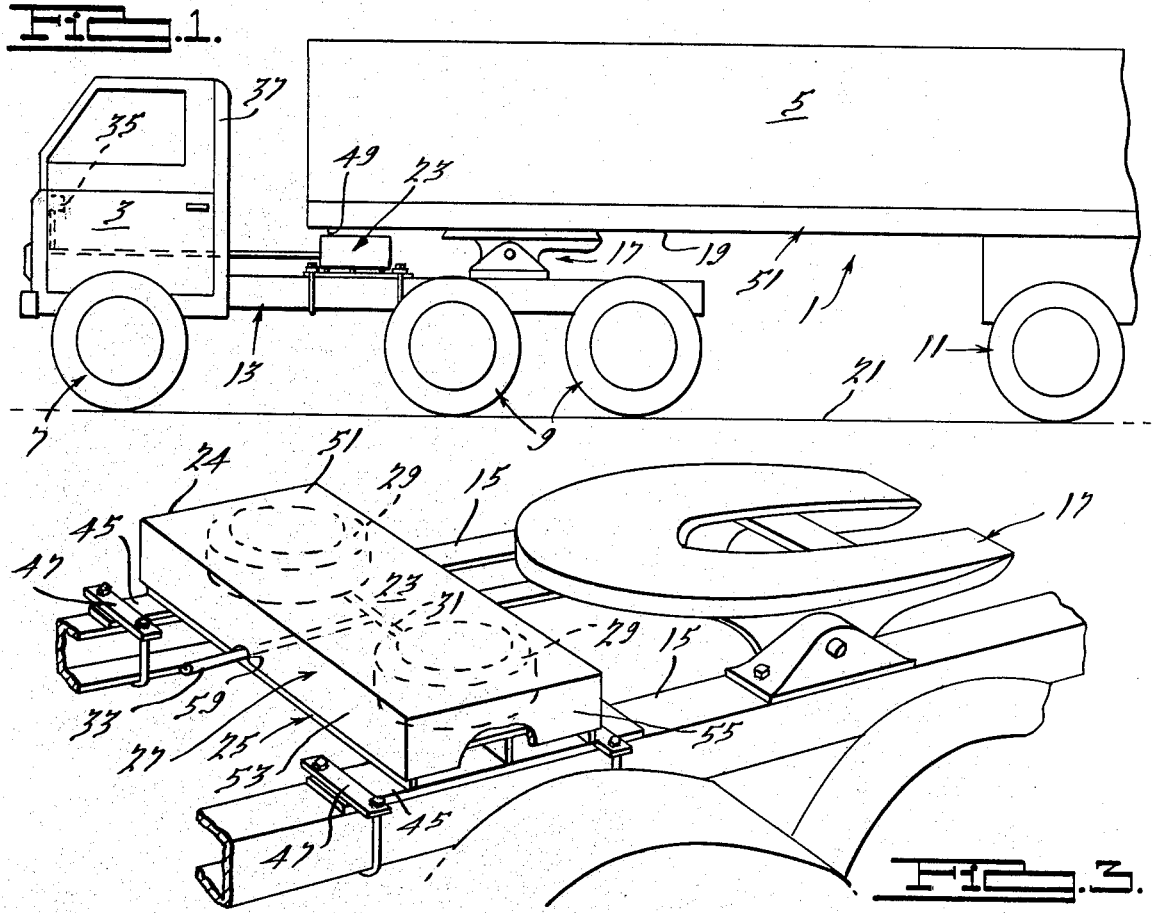
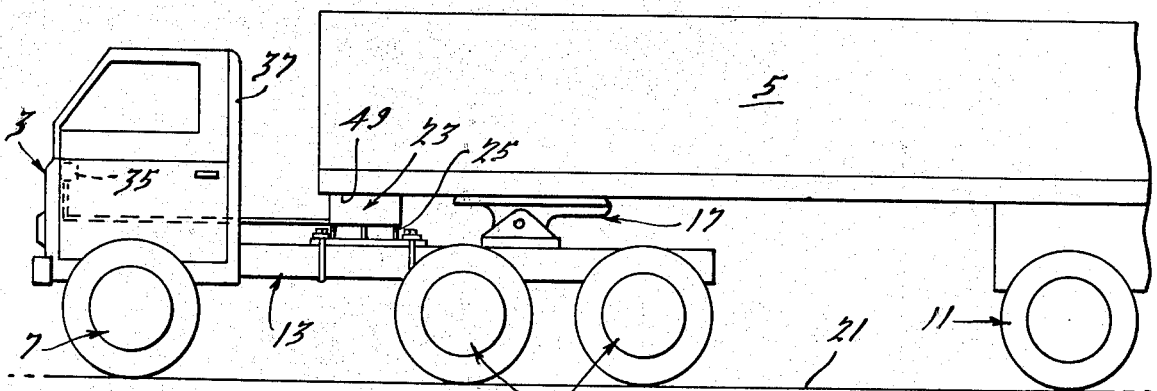
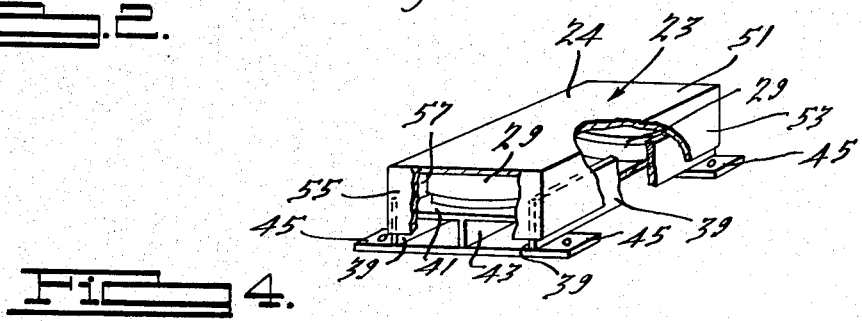

TRAILER LOAD SUPPORTING ASSEMBLY

BACKGROUND

My previous U.S. Pat. Nos. 3,580,609, issued May 25, 1971, and 3,776,573, issued Dec. 4, 1973, provide background information and structural and operational details that are applicable to the present invention and the disclosures of these patents are incorporated herein by reference.

BRIEF SUMMARY OF THE INVENTION

It is the purpose of the present invention to provide relatively simple air bag structure for supporting the front end of a trailer on the rear end of a tractor and for shifting or adjusting a part of the trailer load with respect to the tractor wheels.

The invention accomplishes this purpose by means of an air bag unit that may be secured on the tractor frame ahead of the fifth wheel and the tractor drive wheels and beneath the front end of the trailer. The unit includes a housing in the form of a base plate member that is clamped to the tractor and a top member in the shape of an inverted pan that fits over the base plate on all four sides. Air bags are supported on the base plate and they in turn support the top member. When the bags are inflated the top member is pressed against the bottom of the trailer frame whereby the air bags can take load from the trailer. Some of this trailer load is thereby shifted to the front end of the tractor, i.e., to the steering axle and wheels, and this portion of the load is subtracted from the normal fifth wheel load on the rear axle or axles of the tractor. The amount of air bag inflation and amount of shifting is adjustable and under control of the driver.

When the air bag unit of this invention is used, the effect is substantially the same as that obtained if a fifth wheel is slid forwardly. However, attempting to move a sliding fifth wheel sometimes can cause damage to universal joints, drive shaft, or clutch, and all of this is obviated by means of the load shifting principle embodied in the invention. Shifting of a part of the tractor load to the steering axle is done conveniently by the driver from a control valve in the tractor cab without any movement of the fifth wheel.

The device permits the driver a wide range of discretion in the amount of weight he can shift and he can literally custom fit the payload to the rated capacity of his tractor and trailer so that he can haul up to the limit that the law permits. He can correct many misload or overload conditions and can load the steering axle to its full capacity.

The unit can be used to give the driver a more comfortable ride and can remove much of the rough ride found in twin-screw or tandem tractors equipped with rough riding suspensions. Much road shock is cushioned by the air bags.

The unit can also be of assistance in dropping a loaded trailer so that the driver can rehook without slamming into the trailer. In doing this he sets the trailer brakes and cranks down the dollies; unlocks the fifth wheel and pulls the trailer ahead slightly to free the trailer pin; then inflates the air bags and cranks down the dollies even more; after which the air bags may be deflated and the tractor disconnected and rehooked when desired.

DESCRIPTION OF THE DRAWINGS

FIG. 1 is a schematic side elevation of a truck comprising a tractor and trailer interconnected by means of a fifth wheel on the tractor and having an air bag unit in accordance with invention and showing the air bag unit in an inoperative condition;

FIG. 2 is a view similar to FIG. 1 but shows the air bag in operation;

FIG. 3 is an enlarged perspective view with parts broken away showing the air bag unit clamped in place on the side frame members of a tractor;

FIG. 4 is a perspective view of the air bag unit with parts broken away.

DESCRIPTION OF THE INVENTION

A typical truck 1, for over-the-road operation, comprises a tractor 3 and a trailer 5. The tractor 3 has a steering axle and wheel assembly 7 and drive axle and wheel assemblies 9. The trailer 5 has one or more wheel and axle assemblies 11. The tractor 3 has a frame assembly 13, which includes a pair of parallel longitudinal extending channel-like side rail members 15 and these support the typical fifth wheel assembly 17 in the vicinity of the drive axles 9. The fifth wheel assembly is adapted to be connected to a trailer pin (not shown) extending downwardly from the bottom frame 19 of the trailer 5 whereby the tractor 3 and trailer 5 may be connected and disconnected in the usual manner.

As can be seen in FIG. 1, the load or weight of the trailer 5 is transmitted into the roadway 21 through the trailer wheels 11 and through the wheels of the tractor 3 by way of the fifth wheel assembly 17 with the arrangement shown in FIG. 1. In this conventional arrangement, the load applied to the tractor 3 is concentrated on the driving wheels 9 because of the location of the fifth wheel.

In accordance with the present invention, and as more broadly revealed in my aforementioned United States patents, I propose to redistribute the load applied by the trailer 5 to the tractor 3 by means of an arrangement which takes some of the load from the fifth wheel assembly 17 and redistributes it to wheel assemblies 7 and 11, thereby reducing the load on the drive wheels and axles 9. My present invention provides a device of very simple construction for accomplishing this and is embodied in preferred form in the air bag unit 23.

The air bag unit 23 comprises a housing 24 that includes a base member 25 and a top member 27 which fits over and around the outside of the base member 25. A pair of air bags 29 of a type available on the open market is mounted within the housing defined by the members 25 and 27 and rest on the top of the base member 25. The two bags are interconnected by a conduit 31 and this in turn is connected to a single conduit 33. The conduits 31 and 33 permit air pressure to be applied equally to the two air bags. The conduit 33 is connected to an air line control valve 35 within the cab 37 of the tractor 3 for easy control by the driver of the truck. The conduit 33 is a part of an air supply system (not shown) on the truck that may be similar to or the same as systems shown in my two previous U.S. patents that have been referred to above, the disclosure thereof being incorporated herein by reference.

The base 25 of the unit 23 is preferably of H cross section with vertically extending side legs 39 and a horizontal web 41 extending between them to provide a surface that supports the bottom faces of the two air bags 39. If desired, a rib 43 may be welded to the bottom side of the web 41 to extend parallel to the side legs 39 and rigidify the web against deflection due to the load that is applied to it. Opposite bottom ends of the side legs 39 are welded to straps 45, the straps being spaced apart so that they sit nicely on the top surfaces of the trailer side rails 15 and extend horizontally outwardly in arm-like fashion away from the housing 24. The straps 45 therefore provide flange members or arms for the unit 23 which can be quickly but securely fastened to the tractor frame 13 by means of four U-bolt clamp structures 47. This arrangement of arms 45 and U-bolt clamps 47 enables the unit 23 to be placed in exactly the most desirable longitudinal position on the tractor frame. As shown in FIGS. 1 and 2, the unit is preferably located between the front and rear axles and at the same time beneath the forward bottom portion 49 of the trailer frame 51.

The top housing member 27 is in the form of an inverted rectangular pan and has a horizontal top wall 51, side walls 53, and end walls 55. The side walls 53 slidably fit over and are guided by the side legs 39 of the base member 25. End walls 55 fit over the opposite ends of the base member 25 and with walls 53 enclose the space between the wall 41 of the base plate and the wall 51 of the platform. Such space is, therefore, a continuously, substantially closed chamber 57 containing and protecting the two air bags 29. A side wall 53 of the top member 27 has a slot 59 in it for passage of the air conduit 33 and to also provide some means for ready access of pressure equalizing air flow into and out of the chamber 57 over and beyond that which can occur in clearances between the telescoping top and bottom housing members 25 and 27.

In operation, the flow of air to and from the air bags 29 is under control of the truck driver by way of the air control valve 35. When he desires to shift weight of the trailer, to soften his ride, or to provide assistance in dropping the trailer 5, he simply activates air pressure so that it flows to the air bags 29. This causes them to inflate raising the platform 27 into contact with the bottom end 49 of the trailer 5 as shown in FIG. 2. The amount of load created by the air bag unit assembly 23 depends upon the amount of pressure applied to the air bags. The weight of the trailer 5 is in part supported on the top member 27 which in turn is supported on the air bags 29 and these in turn are supported on the base 25 which transfers its load into the straps 45 and then into the side rails 15 of tractor frame 13. Since the unit is located ahead of the fifth wheel 17 the result is a load shift, absorption of shocks normally transmitted from the trailer 5 through the fifth wheel assembly 17 and into the side rails. The devise can also be used in conjunction with the trailer dollie (not shown) to help drop and rehook a trailer as previously mentioned. The driver can at any time deactivate the device by releasing the air pressure, allowing the air bags to settle and the top member to settle on the base member so that it separates from the bottom of the trailer.

Modification of the specific details shown may be made without departing from the spirit and scope of the invention.

I claim:

1. A trailer load supporting device for mounting on the longitudinal side rails of a truck tractor frame in a position ahead of the fifth wheel and adapted to selectively engage the bottom of a trailer connected to the fifth wheel and exert a selected support load against it comprising a housing having a base member to rest on top of said side rails and a top member to engage the bottom of said trailer, said base member including transverse arms to extend along the side rails and providing means for securing the housing in fixed position on said side rails, said top member being in the form of an inverted pan with peripheral side walls and a first horizontal wall extending between the side walls and providing a closed top side, said top member having an open bottom side receiving the base member so that the base member is telescoped inside of the top member, said base member having a second horizontal wall parallel to said first horizontal wall, the space between said horizontal walls and the overall vertical dimension of the housing varying in height in accordance with telescopic movement of the top member on the base member, and said space being substantially closed by said members during telescopic movement thereof, and inflatable air bag means in the space between the top and bottom housing members for applying a selected pressure to the horizontal walls of the respective members tending to separate them and increase the height of said space and housing and to provide means for applying a lifting load to the bottom of a trailer, said bottom member having a channel-like H-shaped cross section with a web extending between side legs thereof and forming said horizontal wall.

2. A device as set forth in claim 1 wherein said bottom member wall has a web reinforcement rib extending parallel to the side legs of the bottom member and extending downwardly from substantially the midline of the web.

3. A device as set forth in claim 1 including straps affixed across the bottom edges of opposite ends of the side legs of the bottom member to provide said arms.

* * * * *